(12) United States Patent
Schimpf et al.

(10) Patent No.: US 12,467,556 B2
(45) Date of Patent: *Nov. 11, 2025

(54) LOCKING APPARATUS FOR WIRE MANAGEMENT WITH SLACK CABLE MANAGEMENT

(71) Applicant: Easy Solar Products, Inc., Sandy, UT (US)

(72) Inventors: Brady Schimpf, Eagle Point, OR (US); Benjamin Wade, Holladay, UT (US)

(73) Assignee: Easy Solar Products, Inc., Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,683

(22) Filed: Nov. 19, 2022

(65) Prior Publication Data

US 2024/0167585 A1 May 23, 2024

(51) Int. Cl.
*F16L 3/01* (2006.01)
*F16B 2/06* (2006.01)
*F16L 3/06* (2006.01)

(52) U.S. Cl.
CPC ............... *F16L 3/01* (2013.01); *F16B 2/06* (2013.01); *F16L 3/06* (2013.01)

(58) Field of Classification Search
CPC ............... F16L 3/01; F16L 3/06; F16B 2/06
See application file for complete search history.

(56) References Cited

U.S. PATENT DOCUMENTS

| 2,819,923 | A | * | 1/1958 | Anderson | B66C 1/12 294/150 |
| 3,994,521 | A | * | 11/1976 | Van Gompel | F16G 11/108 292/319 |
| 5,147,145 | A | * | 9/1992 | Facey | F16G 11/108 403/328 |

(Continued)

FOREIGN PATENT DOCUMENTS

| AU | 2003203898 B2 | 11/2003 |
| CN | 202848332 U | 4/2013 |

(Continued)

OTHER PUBLICATIONS

BV 4ft security steel cable with loops for U-lock sold on amazon. first available date: Jun. 1, 2017, https://www.amazon.com/dp/B071ZR3RQ6/ref=twister_BOCHTHRYCZ?_encoding=UTF8&th=1 (Year: 2017).*

(Continued)

*Primary Examiner* — Terrell L Mckinnon
*Assistant Examiner* — Ding Y Tan
(74) *Attorney, Agent, or Firm* — KW Law, LLP (57) ABSTRACT

An apparatus for a locking apparatus for wire management is disclosed. The apparatus includes a housing, a fixing member, and a lock mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The (Continued)

apparatus includes a slack management opening integral to the housing and configured to hold a portion of the fixing member extending from the lock path exit.

20 Claims, 7 Drawing Sheets

(56) References Cited

U.S. PATENT DOCUMENTS

| | | | | |
|---|---|---|---|---|
| 5,222,776 A * | 6/1993 | Georgopoulos | ........ | F16G 11/14 292/307 R |
| 5,359,870 A * | 11/1994 | Reutlinger | ........... | A44B 15/00 24/114.5 |
| 5,601,380 A * | 2/1997 | Guthrie | ........... | F16D 1/116 403/328 |
| 5,647,620 A | 7/1997 | Kuenzel | | |
| 5,743,574 A * | 4/1998 | Kohn | ........... | G09F 3/0358 292/315 |
| 5,829,280 A * | 11/1998 | Chen | ........... | E05B 67/003 70/386 |
| 6,131,969 A * | 10/2000 | Natkins | ........... | F16G 11/106 292/307 R |
| 6,152,645 A * | 11/2000 | Sanford | ........... | F16D 41/064 403/322.2 |
| 6,155,617 A * | 12/2000 | Kuenzel | ........... | F16G 11/14 292/307 R |
| 6,540,273 B2 * | 4/2003 | Brammall | ........... | G09F 3/0358 292/318 |
| 7,243,963 B2 * | 7/2007 | De Lima Castro | ... | G09F 3/0352 292/307 R |
| 7,278,665 B2 * | 10/2007 | Rogatnev | ........... | E05B 39/00 292/307 R |
| 8,516,732 B2 * | 8/2013 | Burnsed, Jr. | ........... | F41C 23/02 403/322.2 |
| 9,558,682 B2 * | 1/2017 | Dreisbach | ........... | F16G 11/106 |
| 10,315,817 B2 * | 6/2019 | Martin | ........... | B65D 63/06 |
| 10,400,917 B2 | 9/2019 | Kitago | | |
| 2003/0111846 A1 * | 6/2003 | Brammall | ........... | G09F 3/0358 292/315 |
| 2003/0204937 A1 * | 11/2003 | Bulanda | ........... | B65D 63/08 24/22 |
| 2004/0172790 A1 | 9/2004 | Caveney | | |
| 2005/0006910 A1 * | 1/2005 | Foigel | ........... | G09F 3/037 292/315 |
| 2006/0180717 A1 * | 8/2006 | Shuey | ........... | F16L 3/24 248/72 |
| 2007/0181752 A1 * | 8/2007 | Shuey | ........... | F16G 11/108 248/72 |
| 2009/0071211 A1 * | 3/2009 | Stone | ........... | G09F 3/0352 70/451 |
| 2017/0178546 A1 * | 6/2017 | Kleynerman | ........... | E05B 39/02 |
| 2019/0183553 A1 * | 6/2019 | Bosshard | ........... | A61B 17/82 |
| 2020/0248781 A1 * | 8/2020 | Patterson | ........... | F16G 11/101 |
| 2021/0131148 A1 * | 5/2021 | Schroll | ........... | E05B 67/36 |

FOREIGN PATENT DOCUMENTS

| | | | | |
|---|---|---|---|---|
| CN | 203167903 U | * | 9/2013 | |
| CN | 210556675 U | | 5/2020 | |
| CN | 214825737 U | | 11/2021 | |
| EP | 1172781 A1 | * | 1/2002 | ............ F16G 11/04 |
| EP | 0861994 B1 | * | 10/2002 | |
| EP | 1359356 A1 | | 11/2003 | |
| EP | 1400459 A1 | | 3/2004 | |
| ES | 2764274 T3 | | 6/2020 | |
| FR | 2844857 A3 | | 3/2004 | |
| GB | 1516783 A | | 7/1978 | |
| JP | 4520108 B2 | | 8/2010 | |
| JP | 5271277 B2 | | 8/2013 | |
| KR | 101407950 B1 | | 6/2014 | |
| RU | 2271426 C2 | | 3/2006 | |
| RU | 024128 B1 | * | 6/2014 | |
| TW | M320589 U | | 10/2007 | |
| WO | WO-2003012316 A1 | * | 2/2003 | |
| WO | WO-2006085735 A1 | * | 8/2006 | ............ F16G 11/108 |
| WO | WO-2013116429 A1 | * | 8/2013 | ............ F16G 11/106 |

OTHER PUBLICATIONS

Urban Trapeze Cable Stop sold on amazon first available date: Jan. 16, 2019, https://www.amazon.com/Urban-Trapeze-Adjuster-Gripper-Pieces/dp/B07MVDRKRM?th=1 (Year: 2019).*

Pro Fit, "Bravo Ball & Lock Plate", https://pro-fit-intl.com/products/bravo-ball-lock-plate, Pro Fit International, Inc., pp. 1-3.

U.S. Appl. No. 18/087,634, filed Dec. 22, 2022, Non-Final Office Action mailed Mar. 29, 2024.

PCT/US2023/080403, "International Search Report and the Written Opinion of the International Searching Authority", dated Mar. 19, 2024, pp. 1-18.

* cited by examiner

LOCKING APPARATUS FOR WIRE MANAGEMENT WITH SLACK CABLE MANAGEMENT

FIELD

This invention relates to wire management and more particularly relates to a locking apparatus for wire management with slack cable management.

BACKGROUND

Direct current ("DC") electricity typically flows from solar panels to one or more inverters through wires or cables run under the solar panels. Longer wire runs between the solar panels and inverters adds unnecessary cost, increases electrical resistance, and thus decreases efficiency of the solar power system. Therefore, the ideal route of wires is the shortest distance from panel to inverter. Traditional wire management methods however constrain runs to paths where the wires can be supported at points on mounting structure components or panel frames.

The wires are secured to solar panel frames or mounting structures to ensure the wires do not hang loose, sag, or come into contact with damaging or abrasive surfaces. The act of routing and securing these cables is commonly referred to as "wire management." The mounting structure and panel frames to which the wire management devices attach varies depending on factors such as: size of array, wind and snow loads, type and brand of panels and the mounting system. Current wire management systems break over time after being exposed to sunlight, wind, water, heat, cold, etc. and often fail long before the useful life of the solar panel system. Other wire management systems loosen over time and/or cut the protective cover of solar pane wiring.

SUMMARY

A locking apparatus for wire management is disclosed. The apparatus includes a housing, a fixing member, and a lock mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit.

Another locking apparatus for wire management includes a housing and a fixing member with a first and a second end opposite the first end. The fixing member is flexible and the first end of the fixing member is attached to the housing. The apparatus includes a lock mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit. The portion of the fixing member extending from the lock path exit includes the second end of the fixing member.

Another locking apparatus for wire management includes a housing with a stainless-steel inner portion covered with a covering. The apparatus includes a fixing member with a first and a second end opposite the first end. The fixing member is flexible and the first end of the fixing member is attached to the housing. The apparatus includes a lock mechanism within the housing configured to resist movement of the fixing member in a first direction and to allow movement of the fixing member in a second direction opposite the first direction. The apparatus includes a lock path extending from a lock path entrance, through the locking mechanism to a lock path exit. The apparatus includes a slack management opening integral to the housing and configured to hold a portion of the fixing member extending from the lock path exit. The portion of the fixing member extending from the lock path exit includes the second end of the fixing member. The slack management opening includes a slot on the housing where the slot is shaped to accommodate and retain a slack portion of the fixing member and where the slack portion of the fixing member on the portion of the fixing member extends from the lock path exit, and/or an opening through the housing. The opening is different from the lock path. Insertion of the fixing member into the opening holds the locking mechanism in a locked position.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

FIG. 10 DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A locking apparatus for wire management is disclosed. The apparatus includes a housing, a fixing member, and a lock mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit.

In some embodiments, the slack management opening includes a slot on the housing. The slot is shaped to accommodate and retain a slack portion of the fixing member. The slack portion of the fixing member is on the portion of the fixing member extending from the lock path exit. In other embodiments, the slot includes one or more locking sections where each locking section is shaped to hold the slack portion of the fixing member in place in the slot. In other embodiments, each locking section of the one or more locking sections includes a narrowed section of the slot sized for a compression fit of the fixing member into the narrowed section. In other embodiments, each locking section of the one or more locking sections includes a narrowed opening above a portion shaped to accommodate the fixing member where the narrowed opening flexes to allow a user to press the fixing member into the portion shaped to accommodate the fixing member. In other embodiments, each locking section of the one or more locking sections includes teeth. In other embodiments, the one or more locking sections include a locking section at a first end of the slot and a second locking section at a second end of the slot opposite the first end of the slot.

In some embodiments, the fixing member is flexible. In other embodiments, the fixing member includes a stainless-steel cable with a covering. In other embodiments, a first end of the fixing member is attached to the housing and the portion of the fixing member extending from the lock path exit has a second end opposite the first end. In other embodiments, the slack management opening includes an opening through the housing where the opening is different from the lock path. In other embodiments, insertion of the fixing member into the opening holds the locking mechanism in a locked position. In other embodiments, the locking mechanism includes one or more balls and the opening is positioned so the fixing member is positioned in the opening to hold one or more of the one or more balls in a locked position. The locked position prevents movement of the fixing member in at least one direction.

In some embodiments, the slack management opening includes an opening sized to accommodate a slack portion of the portion of the fixing member extending from the lock path exit. The opening is sized to accommodate the slack portion looped into the opening. In other embodiments, the housing includes a metal body with a covering. The covering includes an opening exposing a marking on the metal body. The metal includes stainless-steel, steel, zinc-coated steel, and/or aluminum.

Another locking apparatus for wire management includes a housing and a fixing member with a first and a second end opposite the first end. The fixing member is flexible and the first end of the fixing member is attached to the housing. The apparatus includes a lock mechanism within the housing configured to resist movement of the fixing member in a first direction and to allow movement of the fixing member in a second direction opposite the first direction. The apparatus includes a lock path extending from a lock path entrance, through the locking mechanism, to a lock path exit. The apparatus includes a slack management opening integral to the housing and configured to hold a portion of the fixing member extending from the lock path exit. The portion of the fixing member extending from the lock path exit includes the second end of the fixing member.

In some embodiments, the slack management opening includes a slot on the housing the slot is shaped to accommodate and retain a slack portion of the fixing member. The slack portion of the fixing member is on the portion of the fixing member extending from the lock path exit. In other embodiments, the slot includes one or more locking sections where each locking section is shaped to hold the slack portion of fixing member in place in the slot. In other embodiments, the housing includes an opening through the housing. The opening is different from the lock path. Insertion of the fixing member into the opening holds the locking mechanism in a locked position.

Another locking apparatus for wire management includes a housing with a stainless-steel inner portion covered with a covering. The apparatus includes a fixing member with a first and a second end opposite the first end. The fixing member is flexible and the first end of the fixing member is attached to the housing. The apparatus includes a lock mechanism within the housing configured to resist movement of the fixing member in a first direction and to allow movement of the fixing member in a second direction opposite the first direction. The apparatus includes a lock path extending from a lock path entrance, through the locking mechanism to a lock path exit. The apparatus includes a slack management opening integral to the housing and configured to hold a portion of the fixing member extending from the lock path exit. The portion of the fixing member extending from the lock path exit includes the second end of the fixing member. The slack management opening includes a slot on the housing where the slot is shaped to accommodate and retain a slack portion of the fixing member and where the slack portion of the fixing member on the portion of the fixing member extends from the lock path exit, and/or an opening through the housing. The opening is different from the lock path. Insertion of the fixing member into the opening holds the locking mechanism in a locked position.

Figure 1:
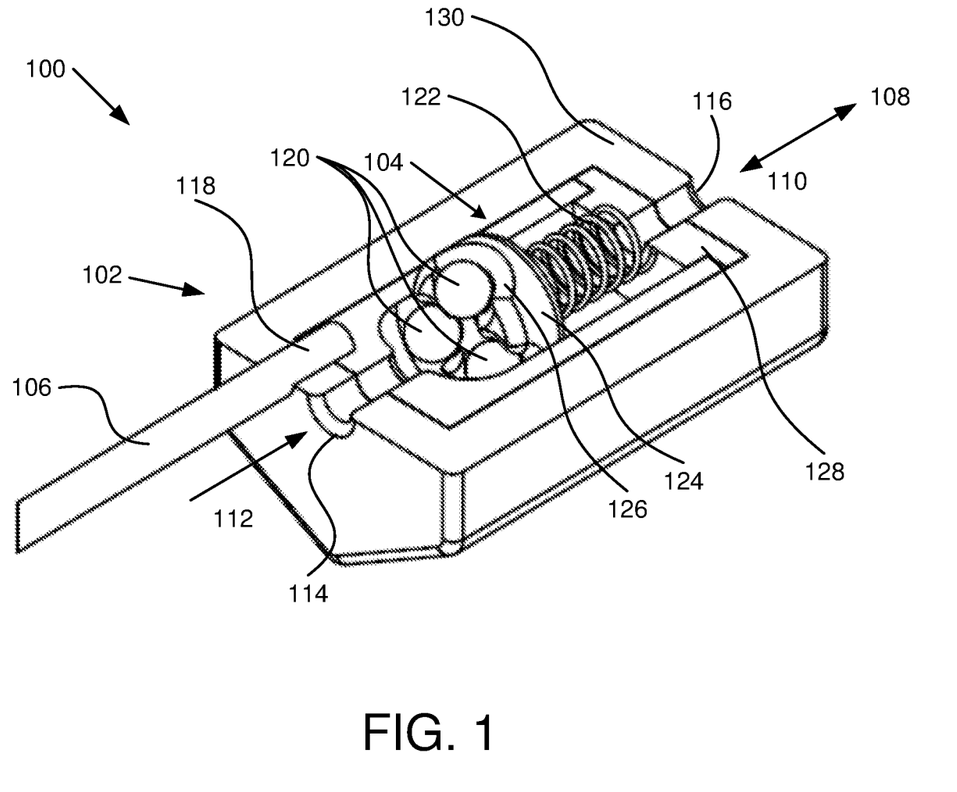
FIG. 1 is a perspective section view illustrating a locking apparatus with a housing with a three-ball locking mechanism and a fixing member connected to the housing, according to various embodiments.

FIG. 1 is a perspective section view illustrating a locking apparatus 100 with a housing 102 with a three-ball locking mechanism 104 and a fixing member 106 connected to the housing 102, according to various embodiments. The locking apparatus 100 is configured to allow the fixing member 106 to surround cables, a structure, etc. and the locking mechanism 104 allows the fixing member 106 to move in a first direction 108 and resist or prevent movement in a second direction 110 opposite the first direction 108.

In some embodiments, the locking apparatus 100 is configured to be used with wiring from a photovoltaic ("PV") solar panel system. Where the locking apparatus 100 is used for a PV solar panel system, the locking apparatus 100 is typically installed outside and is exposed to sun, wind, rain, snow, etc. and is typically expected to last for a long period of time, such as 20 to 40 years.

In some embodiments, the fixing member 106 is flexible. In some embodiments, the fixing member 106 has a cross section that is round, such as a rod, a cable, etc. In other embodiments, the fixing member 106 has a cross section that is square, rectangular, oval, or other shape. In the embodiments of FIG. 1, the fixing member 106 is round. A fixing member 106 that is round, in some embodiments, is a cable. The cable may be stainless-steel, steel, zinc-coated steel, aluminum, etc. In some embodiments, the fixing member 106 is coated with a material that further prevents degradation. The coating material, in some embodiments, is a plastic. In some embodiments, the plastic is ultraviolet ("UV") light resistant, freeze resistant, heat resistant, etc. and is designed to not degrade over the expected life of the locking apparatus 100. In some embodiments, the fixing member 106 is stainless-steel with a UV and weather resistant plastic coating.

In the embodiments of FIG. 1, only a portion of the fixing member 106 is depicted. The fixing member 106 is configured to extend around an object, cables, wires, a structure, etc. or a combination thereof and then extend through a lock path 112 that includes a lock path entrance 114, a pathway through the locking mechanism 104, and to a lock path exit 116. The locking mechanism 104 is designed to allow the fixing member 106 to move through the locking mechanism 104 in a first direction 108 and to resist or prevent movement of the fixing member 106 in a second direction 110 opposite the first direction 108.

In some embodiments, a first end 118 of the fixing member 106 is attached to the housing 102 at an attachment point on the housing 102. In the embodiments, the fixing member 106 is flexible and a second end (not shown) of the fixing member 106 is inserted in the lock path entrance 114 and into the locking mechanism 104. Further insertion of the second end of the fixing member 106 extends the fixing member 106 through the locking mechanism 104 and out the lock path exit 116. Further insertion of the fixing member 106 into the lock path 112 tightens the fixing member 106 around a structure, wiring, etc. The unidirectional nature of the locking mechanism 104 allows the fixing member 106 to be cinched tight around whatever is surrounded by the fixing member 106.

In the embodiments depicted in FIG. 1, the locking mechanism 104 is a three-ball locking mechanism that includes three balls 120 placed in slots that narrow toward the lock path entrance 114. As the three balls 120 are pushed in the direction of the lock path entrance 114, the three balls 120 move closer together and into the fixing member 106. Force applied to the fixing member 106 in the second direction 110 causes the three balls 120 to move in the second direction 110 and against the fixing member 106, which causes a resistance to movement of the fixing member 106 in the second direction 110.

The locking mechanism 104 of FIG. 1 includes a spring 122 that pushes against a plate 124. The plate 124 includes a hole to accommodate the fixing member 106. The plate 124 is against the three balls 120 and the spring 122 pushes on the plate 124 to keep pressure on the three balls 120, which enables resistance of movement of the fixing member 106 in the second direction 110. In some embodiments, the plate 124 includes a retaining structure 126 for each of the three balls 120. The retaining structure 126 for a ball 120, in various embodiments, includes a cup shape, a dent in the plate 124, or the like to retain a ball 120.

When the fixing member 106 is moved in the first direction 108, the three balls 120 move in the first direction 108 and the slots containing each of the three balls 120 widen to reduce pressure on the fixing member 106, which allows movement of the fixing member 106 in the first direction 108.

While a lower half of the housing 102 is depicted in FIG. 1, it is understood that a similar upper half of the housing 102 is also included with the overall housing 102. The housing 102, in some embodiments, includes a metallic body 128. In some embodiments, the three balls 120, retaining structure 126, plate 124, spring, etc. are metal. In some embodiments, the metal is stainless steel, zinc-coated steel, aluminum, or similar metal chosen to last for the life of the locking apparatus 100. In some embodiments, the metal is chosen to not corrode, rust, etc. when exposed to water, wind, sun, etc.

In some embodiments, the metallic body 128 of the housing 102 includes a covering 130. The covering 130, in some embodiments, is chosen to further reduce wear, corrosion, etc. of the locking apparatus 100. In some embodiments, the covering 130 provides electrical insulation between the metallic body 128 and any electrified component external to the locking apparatus 100. In some embodiments, the covering 130 is a plastic. In other embodiments, the covering 130 is a rubber. In other embodiments, the covering 130 is a polymer. In some embodiments, the material for the covering 130 is chosen to last for a desired lifetime of the locking apparatus 100 while being exposed to UV light, water, temperature extremes, wind, sunlight, etc. One of skill in the art will recognize other materials suitable for the covering 130.

As used herein components, arrows, etc. in different figures with like numbers are substantially similar but may have slight differences as explained.

Figure 2A:
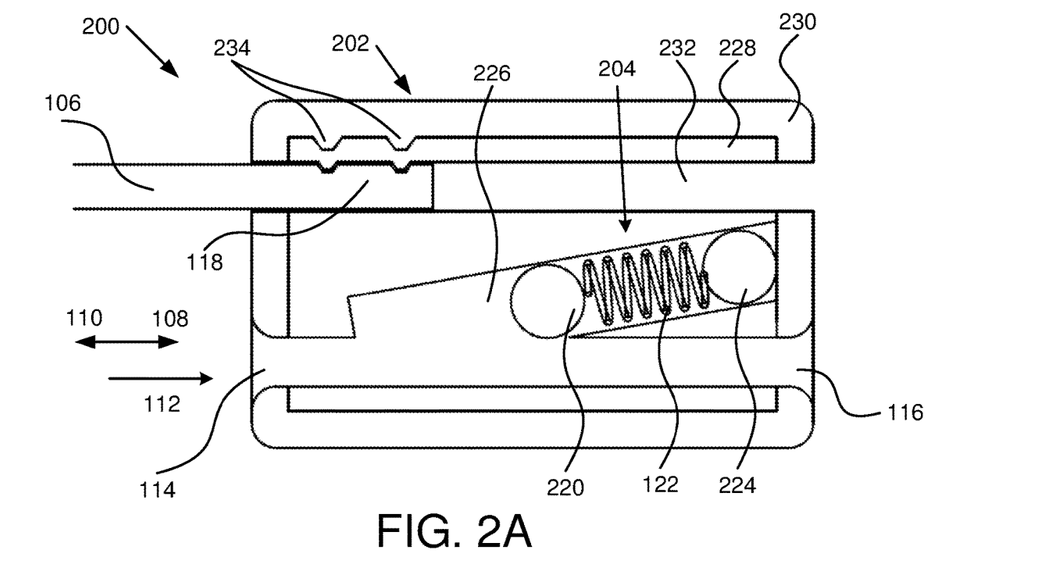
FIG. 2A is a side section view illustrating a locking apparatus with a housing with a one-ball locking mechanism in a first position and a fixing member connected to the housing, according to various embodiments.
Figure 2B:
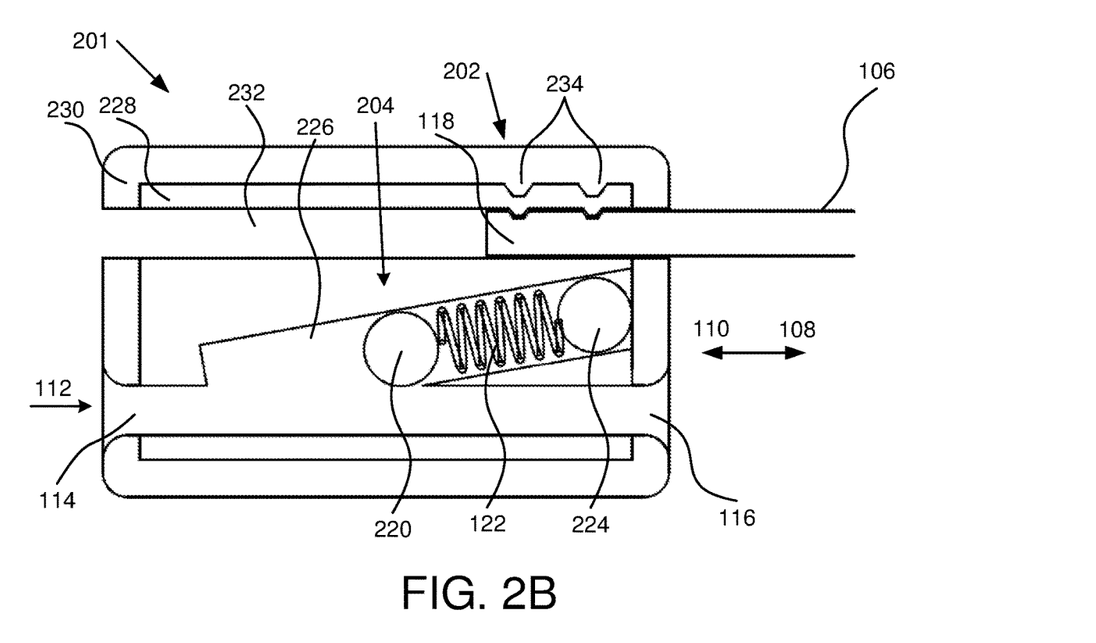
FIG. 2B is a side section view illustrating a locking apparatus with a housing with a one-ball locking mechanism in a second position and a fixing member connected to the housing, according to various embodiments.

FIG. 2A is a side section view illustrating a locking apparatus 200 with a housing 202 with a one-ball locking mechanism 204 in a first position and a fixing member 106 connected to the housing 202, according to various embodiments. FIG. 2B is a side section view illustrating a locking apparatus 201 with a housing 202 with a one-ball locking mechanism 204 in a second position and a fixing member 106 connected to the housing 202, according to various embodiments. The locking apparatus 201 of FIG. 2B is the same as the locking apparatus 200 of FIG. 2A except the fixing member 106 has a first end 118 at an opposite end of the housing 202 than the fixing member 106 of FIG. 2A. The one-ball locking mechanism 204 of FIGS. 2A and 2B operate similar to the three-ball locking mechanism 104 of FIG. 1.

As with the locking apparatus 100 of FIG. 1, the locking apparatus 200 of FIG. 2A is configured to allow the fixing member 106 to surround cables, a structure, etc. and the locking mechanism 204 allows the fixing member 106 to move in a first direction 108 and resist or prevent movement in a second direction 110 opposite the first direction 108. The fixing member 106 of the locking apparatus 200 of FIG. 2 may be flexible as in FIG. 1 or may be rigid and may be attached or detached from the housing 202. The locking apparatus 200 of FIG. 2 is depicted as being attached to the housing 202 at a first end 118 of the fixing member 106.

The fixing member 106 is inserted into the housing 202 through a lock path 112 that includes a lock path entrance 114 and a lock path exit 116 and the lock path 112 extends through the locking mechanism 204. The locking mechanism 204 includes a first ball 220 in a sloped cylinder 226 to impinge on the fixing member 106. A spring 122 presses on the first ball 220. In some embodiments, the locking mechanism 204 of FIG. 2A includes a second ball 224 at an end of the cylinder 226. In other embodiments, the spring 122 is configured to rest against the end of the cylinder 226. In some embodiments, the housing 202 includes an inner metallic body 228. In other embodiments, the inner metallic body 228 includes an outer covering 230. The metallic body 228 and outer covering 230 are substantially similar to the metallic body 128 and covering 130 of the locking apparatus 100 of FIG. 1.

The housing 202 of FIGS. 2A and 2B include an opening 232 for the fixing member 106 extending through the housing 202, which, in some embodiments, is for convenience during manufacturing. In other embodiments, the opening 232 does not extend through the housing 202 but instead is a depth to hold the first end 118 of the fixing member 106 and is positioned in the housing 202 based on an intended function. In FIGS. 2A and 2B, the fixing member 106 can be inserted into either end of the opening 232 and crimped into place. Crimping marks 234 are depicted in FIGS. 2A and 2B. In other embodiments, the fixing member 106 is rigid and is not attached to the housing 202 at the first end but is instead U-shaped. The rigid fixing member 106 may then be looped around something and a second end of the fixing member 106 is inserted into the lock path 112 and pushed into the lock path 112 until a portion of the first end 118 of the fixing member 106 is inserted into the opening 232. In other embodiments, the rigid fixing member 106 is first inserted into the opening 232 and pushed further into the opening 232 until an end of the rigid fixed member 106 enters the lock path 112 and extends through the locking mechanism 104.

Figure 3:
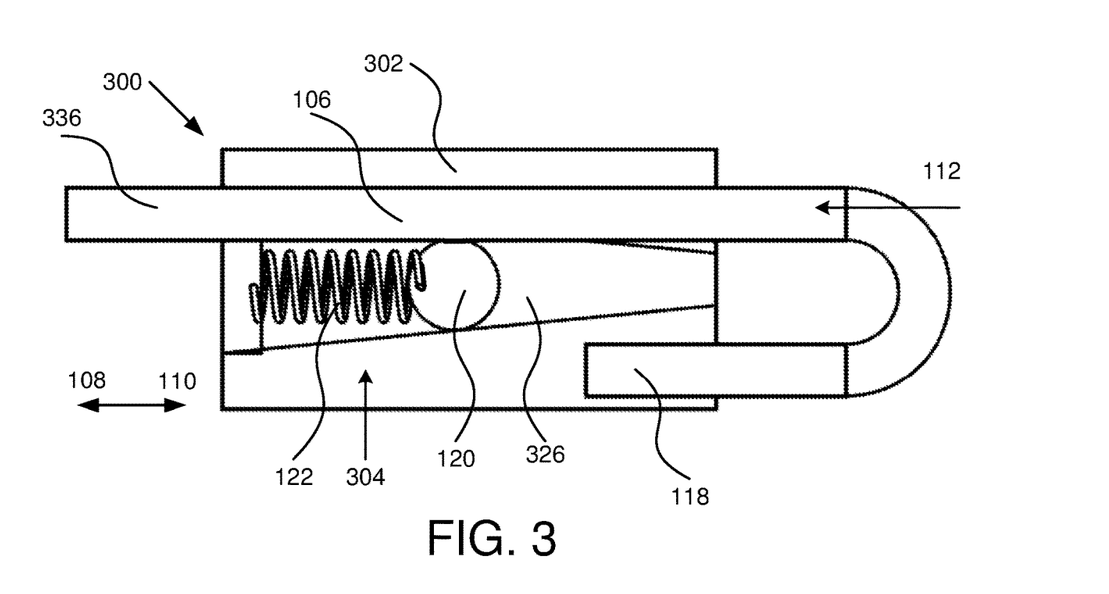
FIG. 3 is a side section view illustrating a locking apparatus with a housing with a one-ball locking mechanism and a first end of a fixing member connected to the housing and a second end of the fixing member extending through a lock path that includes the locking mechanism, according to various embodiments.

FIG. 3 is a side section view illustrating a locking apparatus 300 with a housing 302 with a one-ball locking mechanism 304 and a first end 118 of a fixing member 106 connected to the housing 302 and a second end 336 of the fixing member 106 extending through a lock path 112 that includes the locking mechanism 304, according to various embodiments. The one-ball locking mechanism 304 of FIG. 3 functions similar to the one-ball locking mechanism 204 of FIGS. 2A and 2B and include a ball 120, a spring 122, and a sloped cylinder 326 or similar shape.

In some embodiments, the fixing member 106 is flexible and is attached to the housing 302 at a first end 118 while a second end 336 is pushed through a lock path 112. In other embodiments, the fixing member 106 is rigid and the second end 336 of the fixing member 106 is first inserted into the lock path 112 and pushed until the first end 118 of the fixing member 106 is inserted into a hole in the housing 302. The fixing member 106 is able to be inserted in a first direction 108 into the lock path 112 and the locking mechanism 304 prevents the fixing member 106 from moving in a second direction 110 opposite the first direction 108. While a covering is not shown for the locking apparatus 300 of FIG. 3, in some embodiments the housing 302 includes a covering, which may be similar to the coverings 130 of FIGS. 1, 2A, and 2B.

Figure 4:
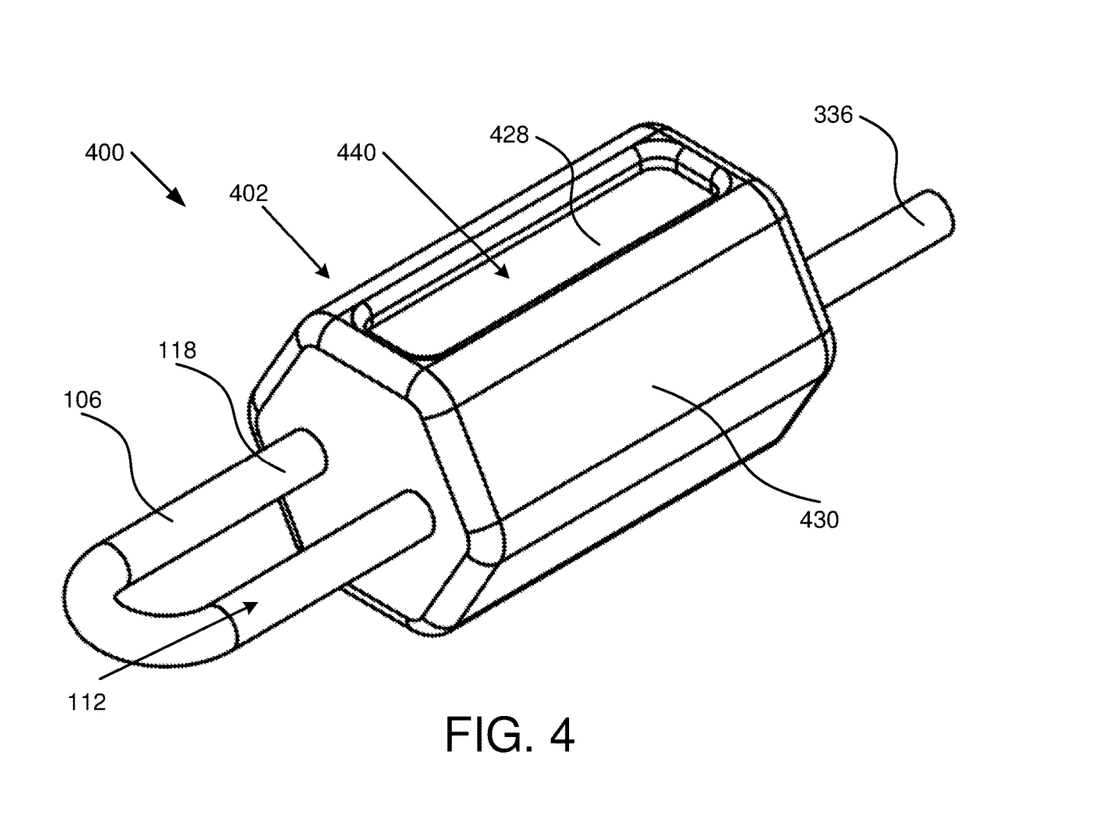
FIG. 4 is a perspective view illustrating a locking apparatus with a first end of a fixing member connected to a housing and a second end of the fixing member extending through a lock path that includes a locking mechanism and an opening in a covering exposing a metallic portion of the housing, according to various embodiments.

FIG. 4 is a perspective view illustrating a locking apparatus 400 with a first end 118 of a fixing member 106 connected to a housing 402 and a second end 336 of the fixing member 106 extending through a lock path 112 that includes a locking mechanism (not shown) and an opening 440 in a covering 430 exposing a metallic body 428 of the housing 402, according to various embodiments. The opening 440 exposing the metallic body 428, in some embodiments, provides a convenient location to imprint a serial number, an identification, or other markings on the metallic portion, which is required in some jurisdictions. In some examples, the metallic body 428 includes an identification required by the National Electrical Code. In some embodiments, the opening 440 is formed when the covering 430 is formed. In other embodiments, the opening 440 is cut out of the covering 430. In some embodiments, the metallic body 428 is substantially similar to the metallic body 128, 228 of FIGS. 1, 2A, and 2B and housing 302 of FIG. 3. While the opening 440 is depicted in a side of the housing 402, in other embodiments the opening 440 is on an end of the housing 402.

Figure 5:
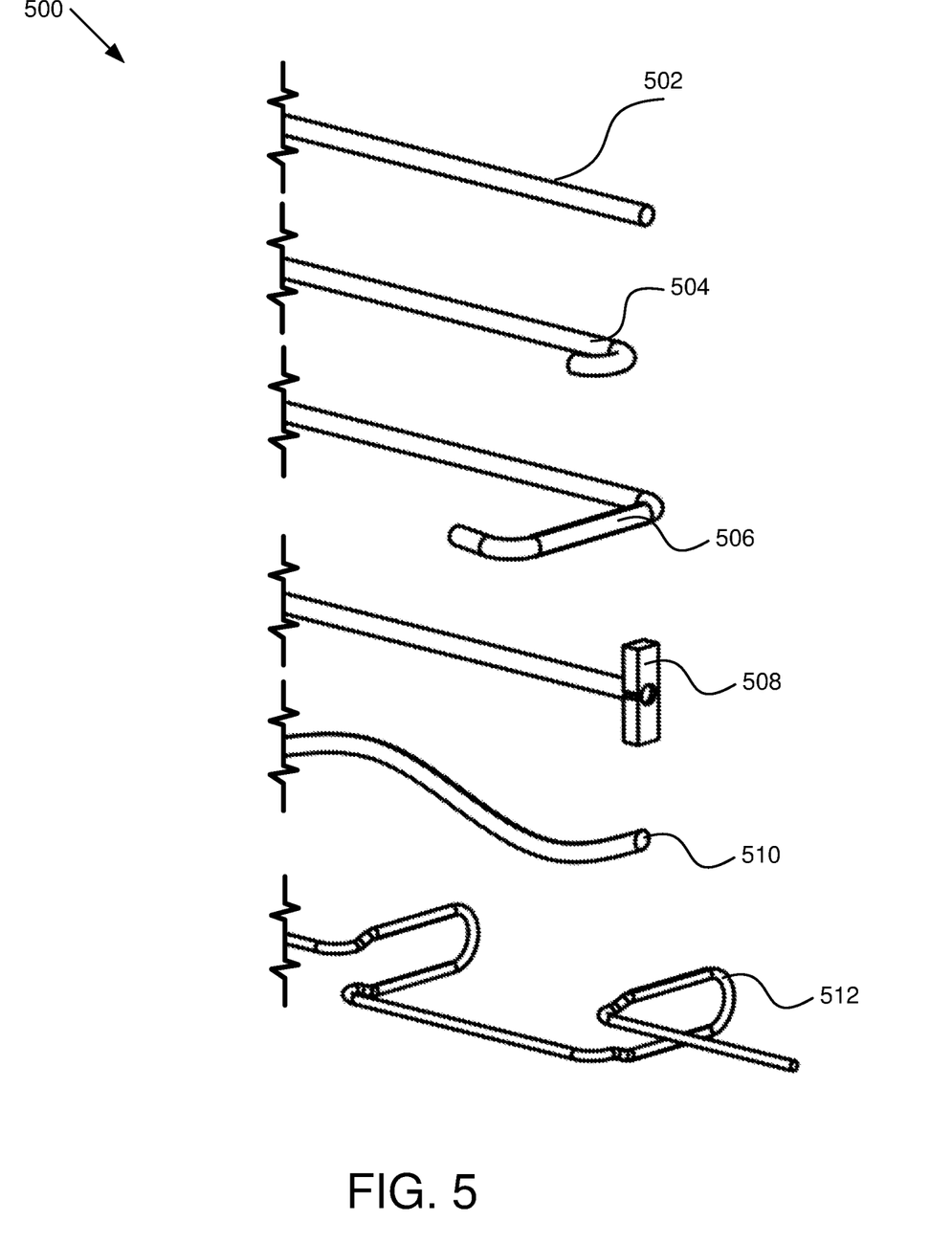
FIG. 5 is a perspective view of various fixing members, according to various embodiments.

FIG. 5 is a perspective view of various fixing members 500, according to various embodiments. A first fixing member 502 is rigid and strait. A second fixing member 504 is rigid and includes a short hook, which may be used to insert back into an opening in a housing, insertion into a drain hole on a solar panel frame, or the like. A third fixing member 506 is rigid and includes a wide hook, which may be used to extend around a structural element or something similar, such as a solar panel frame. A fourth fixing member 508 includes a tab on the end that could be secured in an unused hole in a structure. A fifth fixing member 510 is flexible. A sixth fixing member 512 is rigid and is shaped to form a cable hanger. One of skill in the art will recognize other ways to form a fixing member to be used with a locking apparatus.

Figure 6:
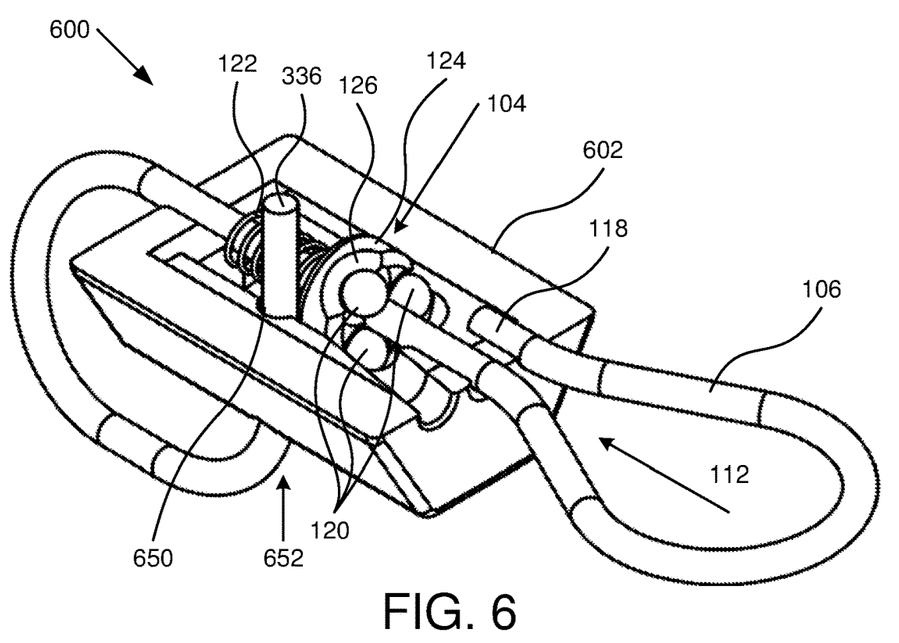
FIG. 6 is a perspective section view illustrating a locking apparatus with a housing with a three-ball locking mechanism and a first end of a fixing member connected to the housing, the fixing member extending through a lock path where the lock path includes the locking mechanism, and a second end of the fixing member extending through an opening that holds the locking mechanism in a locked position, according to various embodiments.

FIG. 6 is a perspective section view illustrating a locking apparatus 600 with a housing 602 with a three-ball locking mechanism 104 and a first end 118 of a fixing member 106 connected to the housing 602, the fixing member 106 extending through a lock path 112 where the lock path 112 includes the locking mechanism 104, and a second end 336 of the fixing member 106 extending through an opening 650 that holds the locking mechanism 104 in a locked position, according to various embodiments. In the locking apparatus 600 of FIG. 6, the locking mechanism 104 is a three-ball locking mechanism 104, which is similar to the three-ball locking mechanism 104 of FIG. 1 and includes three balls 120, a spring 122, a plate 124, and a retaining structure 126. Other locking apparatuses with an opening 650 that holds a locking mechanism in a locked position include different locking mechanisms.

In the locking apparatus 600 of FIG. 6, the fixing member 106 runs through an opening 650 in the housing 602 that is strategically placed to hold the plate 124 in a locked position, which reinforces locking done by the locking mechanism 104. The opening 650 creates a slack cable path 652 that is different from the lock path 112 and when the fixing member 106 is inserted into the slack cable path 652, the locking mechanism 104 is held in a locked position.

In some embodiments, the locking mechanism 104 includes one or more balls 120, such as the three-ball locking mechanism 104 of FIG. 6, and the slack cable path 652 is positioned so the fixing member is positioned in the opening 650 to hold one or more of the one or more balls 120 in a locked position. The locked position prevents movement of the fixing member 106 in at least one direction. In some embodiments, the locked position prevents movement of the fixing member 106 in either direction through the locking path 112.

For locking mechanisms 104 that include a plate 124, in some embodiments, the slack cable path 652 is positioned so that the fixing member 106 runs next to the plate 124 on a side opposite the balls 120 and the fixing member 106 holds the plate 124 in a position so that the balls 120 are wedged against the fixing member 106 in a locked position. In other embodiments, the slack cable path 652 is positioned adjacent to one or more balls 120 so that the balls 120 are wedged against the fixing member 106 in a locked position. In other locking mechanism designs, the slack cable path 652 is positioned near other components that cause a locked position of the locking mechanisms.

While the locking apparatus 600 of FIG. 6 depicts the fixing member 106 extending through the slack cable path 652, other embodiments include other components inserted into a slack cable path 652 or similar slot in the housing 602 to secure the locking mechanism 104, 204, 304, etc. into a locked position. The other component may include a rod, a shaft, a wire, a device connected to a button, or other type of component arranged to hold a plate 124, one or more balls 120, or other element of the locking mechanism 104, 204, 304, etc. into a locked position.

In some embodiments, the slack cable path 652 serves to position a slack portion of the fixing member 106 extending from the lock path exit 116 in a convenient location so that the slack portion is not hanging loose. In some embodiments, the slack cable path 652 serves as all or a portion of a slack management opening.

Figure 7:
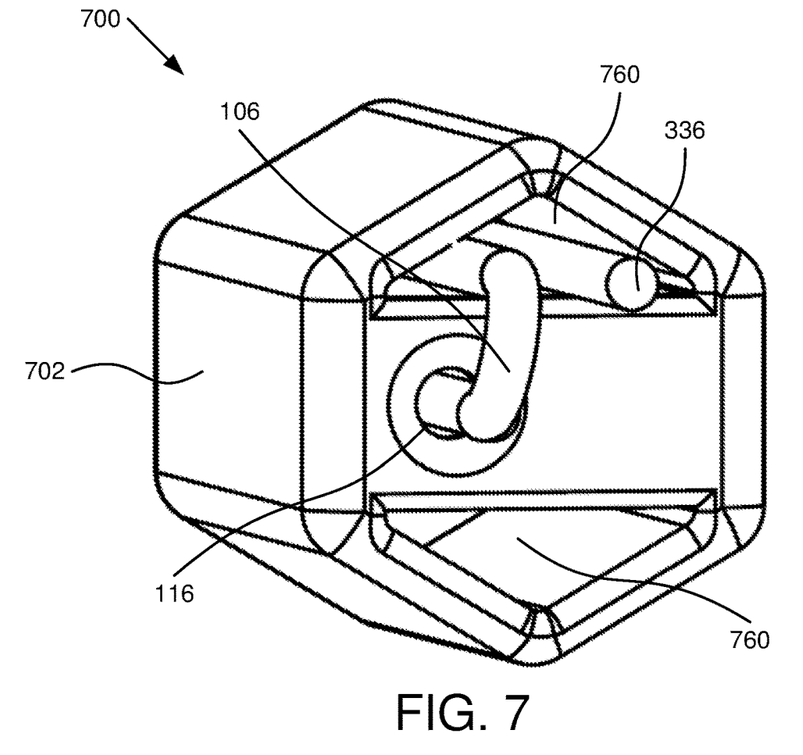
FIG. 7 is a perspective view illustrating a locking apparatus with a housing with a locking mechanism and a fixing member extending through a lock path of the housing and a slack end of the fixing member inserted into one of two triangular slack management openings, according to various embodiments.

FIG. 7 is a perspective view illustrating a locking apparatus 700 with a housing 702 with a locking mechanism (not shown) and a fixing member 106 extending through a lock path of the housing 702 and a slack end of the fixing member 106 inserted into one of two triangular slack management openings 760, according to various embodiments. The locking mechanism may be a three-ball locking mechanism, a one-ball locking mechanism, or other locking mechanism. The housing 702, in some embodiments, includes a metallic body surrounded by a covering, similar to the metallic bodies 128, 228, 428 and coverings 130, 230, 430 of FIGS. 1, 2A, 2B, 3, 4, and 6 described above.

The housing 702 includes two triangular slack management openings 760 that are useful to manage a slack portion of the fixing member 106 beyond a lock path exit 116. In some embodiments, the triangular slack management openings 760 are sized to allow the slack portion of the fixing member 106 to be folded over and inserted. Where there are two triangular slack management openings 760, parts of the slack portion of the fixing member 106 may be inserted in both triangular slack management openings 760. Beneficially, the triangular slack management openings 760 provide convenient storage of the slack portion of the fixing member 106 without having to cut the slack portion of the fixing member 106. In other embodiments, the slack management openings 760 are of a different shape, such as rectangular, oval, or other convenient shape. In some embodiments, the slack management opening 760 is sized to insert a U-shaped portion of the slack end of the fixing member 106.

Figure 8A:
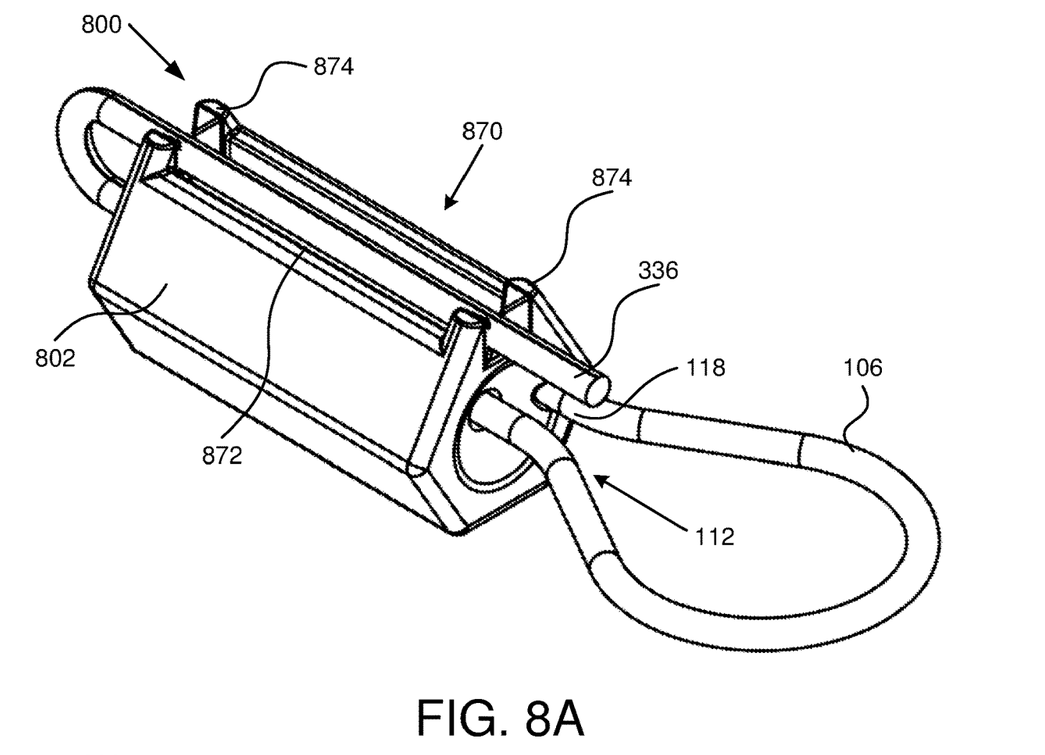
FIG. 8A is a perspective view illustrating a locking apparatus with a housing with a locking mechanism and a fixing member extending through a lock path of the housing and a slack portion of the fixing member inserted into a slack management openings in the form of a slot, according to various embodiments.
Figure 8B:
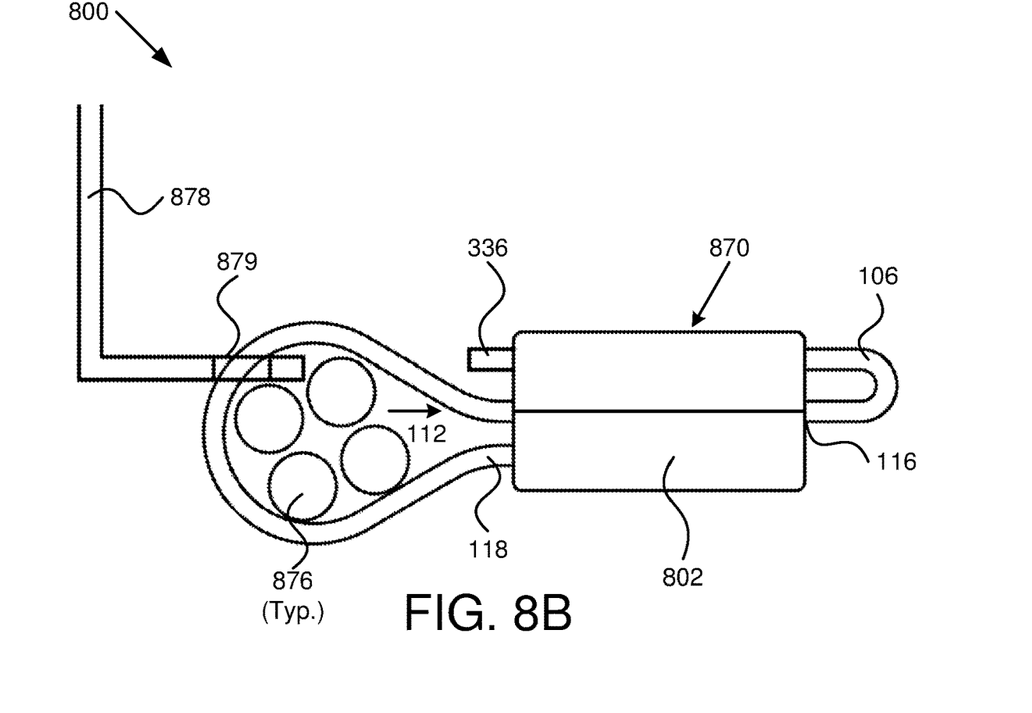
FIG. 8B is a side view illustrating a locking apparatus with a housing with a locking mechanism and a first end of a fixing member attached to the housing wrapping around cables and through a structure and extending through a lock path of the housing and a slack portion of the fixing member inserted through a slack management opening and exiting the housing, according to various embodiments.

FIG. 8A is a perspective view illustrating a locking apparatus 800 with a housing 802 with a locking mechanism and a fixing member 106 extending through a lock path 112 of the housing 802 and a slack portion of the fixing member inserted into a slack management opening 870 in the form of a slack management slot 872, according to various embodiments. FIG. 8B is a side view illustrating a locking apparatus 800 with a housing 802 with a locking mechanism and a first end 118 of a fixing member 106 attached to the housing 802 wrapping around cables 876 and through a structure 878 and extending through a lock path 112 of the housing 802, and a slack portion of the fixing member 106 inserted through a slack management opening 870 and exiting the housing 802, according to various embodiments.

In some embodiments, the slack management opening 870 includes a slack management slot 872 on the housing 802 where the slack management slot 872 is shaped to accommodate and retain a slack portion of the fixing member 106. The slack portion of the fixing member 106 is on a portion of the fixing member 106 extending from the lock path exit 116. The slack management opening 870 is intended to provide a convenient way to handle the slack portion of the fixing member 106 without having to trim off the slack portion.

Figure 9:
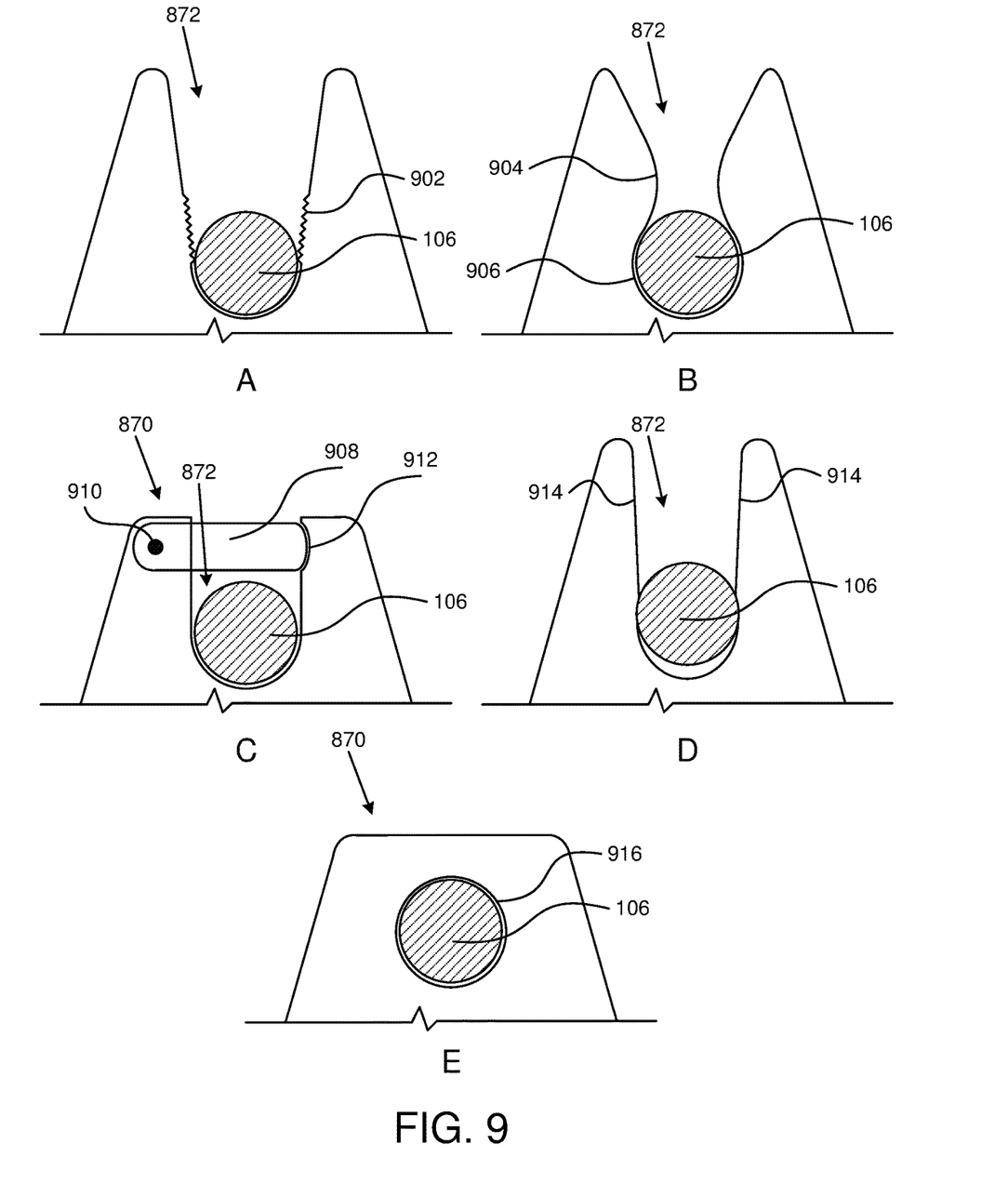
FIG. 9 is an end view of slack management openings, according to various embodiments.

In some embodiments, the slack management slot 872 includes one or more locking sections 874 where each locking section 874 is shaped to hold the slack portion of the fixing member 106 in place in the slack management slot 872. In the embodiments of FIG. 8A, the slack management opening 870 includes a locking section 874 at each end of the slack management slot 872. In other embodiments, the slack management opening 870 includes one or more additional locking sections 874. Versions of the locking sections 874 are described in more detail with regard to FIGS. 9A-9E.

FIG. 8B is a use case showing how the locking apparatus 800 may be used to secure cables to a structure. The locking apparatuses 100, 200, 300, 400, 600, 700 may also be used in a way similar to the locking apparatus 800 of FIG. 8B. In some embodiments with a flexible fixing member 106 attached to the housing 802, the fixing member 106 may then be looped around cables 876 and/or an opening 879 in a structure 878 and then a second end 336 of the fixing member 106 is inserted through a lock path 112 of the housing 802. A slack portion of the fixing member 106 exiting a lock path exit 116 may be pulled to tighten the fixing member 106 around the cables 876 and/or opening 879 of the structure 878. Note that the cables 876 may be electrical wires, communication wires, structural cables, hydraulic lines, flexible or fixed pipes, gas lines, or any other similar element that needs to be cinched together. The fixing member 106 may also be used to anchor cables 876 to a structure 878 of any type, including supports, pipes, beams, structural elements, and the like. One of skill in the art will recognize other cables 876, structures 878, etc. where the locking apparatuses 100, 200, 300, 400, 600, 700, 800 may be used.

As the fixing member 106 is pulled through the lock path 112, the locking mechanism (e.g., 104, 204, 304, etc.) allows the fixing member 106 to be pulled toward the lock path exit 116 without allowing the fixing member 106 to go back in a direction opposite the lock path 112. A slack portion of the fixing member 106 extending from the lock path exit 116 is then hanging free and a user may then insert the slack portion into the slack management opening 870. The slack management opening 870 may be a slack management slot 872 and locking sections 874 as depicted in FIG. 8A, may be a triangular slack management opening 760, or may be a simple opening, such as FIG. 9E, may be a slack cable path 652, or any other type of opening for managing the slack portion of the fixing member 106.

FIG. 9 is an end view of slack management openings 870, according to various embodiments. The slack management openings 870, in various embodiments, are a part of a housing (e.g., 102, 202, 302, 402, 602, 702, 802) of a locking apparatus (e.g., 100, 200, 300, 400, 600, 700, 800). FIG. 9A is an end view of embodiments of a slack management opening 870 in the form of a slack management slot 872 with teeth 902 and with a section view of a fixing member 106 inserted in the slack management slot 872. A user presses the fixing member 106 into the slack management slot 872 and the teeth 902 help the fixing member 106 to remain in place. In some embodiments, the teeth 902 are shaped to hold the fixing member 106 without damaging an outer coating of the fixing member 106.

FIG. 9B is an end view of a slack management slot 872 with a narrow section 904 above a wider section 906 and with a section view of a fixing member 106 inserted in the slack management slot 872, according to various embodiments. The narrow section 904 and wider section 906 create a narrowed opening above a portion shaped to accommodate the fixing member 106. The narrowed opening, in some embodiments, flexes to allow a user to press the fixing member 106 into the portion shaped to accommodate the fixing member 106.

FIG. 9C is an end view of a slack management opening 870 with a cover member 908 in a closed position and with a section view of a fixing member 106 inserted in the slack management opening 870, according to various embodiments. In the embodiments, the cover member 908 is attached to sides of a slack management slot 872 at a hinge point 910, which allows a user to rotate the cover member 908 between an open position and a closed position. One side of the slack management opening 870 includes a depression 912 sized to accommodate an end of the cover member 908. A user inserts a slack portion of the fixing member 106 in the slack management slot 872 and then the user rotates the cover member 908 to a closed position where the end of the cover member 908 opposite the hinge point 910 is in the depression 912, which then retains the slack portion of the fixing member 106.

FIG. 9D is an end view of a slack management slot 872 configured for a compression fit of a fixing member 106 inserted in the slack management slot 872, according to various embodiments. In some embodiments, sides 914 of the slack management slot 872 is slightly tapered and is sized for a compression fit of the fixing member 106 into the slack management slot 872. In some embodiments, the sides of the slack management slot 872 deform a cover of the fixing member 106 as the fixing member 106 is pressed into the slack management slot 872. The fixing member 106 pressed into the slack management slot 872, in some embodiments, deforms and/or the sides 914 of the slack management slot 872 flex to provide enough resistance to hold the fixing member 106 in the slack management slot 872.

FIG. 9E is an end view of a slack management hole 916 in a housing (e.g., 102, 202, 302, 402, 602, 702, 802) and with a section view of a fixing member 106 inserted in the slack management hole 916, according to various embodiments. In the embodiments, the slack management hole 916 is in an end of the housing 102, 202, 302, 402, 602, 702, 802 and runs in a direction similar to the slack management slot 872 of FIGS. 9A-9D. In other embodiments, the housing 102, 202, 302, 402, 602, 702, 802 includes an opening 650 that creates a slack cable path 652 as depicted in FIG. 6 in addition to the slack management hole 916 of FIG. 9E. One of skill in the art will recognize other types of slack management openings 870.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A locking apparatus comprising:
   a housing;
   a fixing member;
   a lock mechanism within the housing configured to resist movement of the fixing member in a first direction and to allow movement of the fixing member in a second direction opposite the first direction;

a lock path extending from a lock path entrance on an exterior first side of the housing, through the locking mechanism, to a lock path exit on an exterior second side of the housing opposite the first side, wherein the second direction is oriented in a direction from the lock path entrance to the lock path exit; and a slack management opening integral to the housing and configured to hold a slack portion of the fixing member extending from the lock path exit, wherein the slack management opening is configured to allow the slack portion to be inserted and removed by having two locking sections at each end thereof shaped to hold the slack portion, and a locking slot shaped to accommodate and retain the slack portion.

2. The locking apparatus of claim 1, wherein the slack management opening comprises a slot on the housing separate from the lock path, the slot is shaped to accommodate and retain a slack portion of the fixing member, the slack portion of the fixing member on the portion of the fixing member extending from the lock path exit.

3. The locking apparatus of claim 2, wherein the slot comprises one or more locking sections, each locking section shaped to hold the slack portion of the fixing member in place in the slot.

4. The locking apparatus of claim 3, wherein each locking section of the one or more locking sections comprises a narrowed section of the slot sized for a compression fit of the fixing member into the narrowed section.

5. The locking apparatus of claim 3, wherein each locking section of the one or more locking sections comprises a narrowed opening above a portion shaped to accommodate the fixing member, wherein the narrowed opening flexes to allow a user to press the fixing member into the portion shaped to accommodate the fixing member.

6. The locking apparatus of claim 3, wherein each locking section of the one or more locking sections comprises teeth.

7. The locking apparatus of claim 3, wherein the one or more locking sections comprise a locking section at a first end of the slot and a second locking section at a second end of the slot opposite the first end of the slot.

8. The locking apparatus of claim 1, wherein the fixing member is flexible.

9. The locking apparatus of claim 1, wherein the fixing member comprises a stainless-steel cable with a covering.

10. The locking apparatus of claim 1, wherein a first end of the fixing member is attached to the housing and wherein the portion of the fixing member extending from the lock path exit comprises a second end opposite the first end.

11. The locking apparatus of claim 1, wherein the slack management opening comprises an opening through the housing, the opening different from the lock path.

12. The locking apparatus of claim 11, wherein insertion of the fixing member into the opening holds the locking mechanism in a locked position.

13. The locking apparatus of claim 12, wherein the locking mechanism comprises one or more balls and wherein the opening is positioned so the fixing member is positioned in the opening to hold one or more of the one or more balls in a locked position, the locked position preventing movement of the fixing member in at least one direction.

14. The locking apparatus of claim 1, wherein the slack management opening comprises an opening sized to accommodate a slack portion of the portion of the fixing member extending from the lock path exit, wherein the opening is sized to accommodate the slack portion looped into the opening.

15. The locking apparatus of claim 1, wherein the housing comprises a metal body with a covering, the covering comprising an opening exposing a marking on the metal body, wherein the metal comprises stainless-steel, steel, zinc-coated steel, and/or aluminum.

16. A locking apparatus comprising:
a housing;
a fixing member comprising a first and a second end opposite the first end, wherein the fixing member is flexible and wherein the first end of the fixing member is attached to the housing;
a lock mechanism within the housing configured to resist movement of the fixing member in a first direction and to allow movement of the fixing member in a second direction opposite the first direction;
a lock path extending from a lock path entrance on an exterior first side of the housing, through the locking mechanism, to a lock path exit on an exterior second side of the housing opposite the first side, wherein the second direction is oriented in a direction from the lock path entrance to the lock path exit; and
a slack management opening integral to the housing and configured to hold a slack portion of the fixing member extending from the lock path exit, wherein the slack portion of the fixing member extending from the lock path exit comprises the second end of the fixing member, wherein the slack management opening is configured to allow the slack portion to be inserted and removed by having two locking sections at each end thereof shaped to hold the slack portion, and a locking slot shaped to accommodate and retain slack portion.

17. The locking apparatus of claim 16, wherein the slack management opening comprises a slot on the housing separate from the lock path, the slot is shaped to accommodate and retain a slack portion of the fixing member, the slack portion of the fixing member on the portion of the fixing member extending from the lock path exit.

18. The locking apparatus of claim 17, wherein the slot comprises one or more locking sections, each locking section shaped to hold the slack portion of fixing member in place in the slot.

19. The locking apparatus of claim 16, wherein the housing comprises an opening through the housing, the opening different from the lock path, wherein insertion of the fixing member into the opening holds the locking mechanism in a locked position.

20. A locking apparatus comprising:
a housing comprising a stainless-steel inner portion covered with a covering;
a fixing member comprising a first and a second end opposite the first end, wherein the fixing member is flexible and wherein the first end of the fixing member is attached to the housing;
a lock mechanism within the housing configured to resist movement of the fixing member in a first direction and to allow movement of the fixing member in a second direction opposite the first direction; and
a lock path extending from a lock path entrance on an exterior first side of the housing, through the locking mechanism, to a lock path exit on an exterior second side of the housing opposite the first side, wherein the second direction is oriented in a direction from the lock path entrance to the lock path exit;
a slack management opening integral to the housing and configured to hold a portion of the fixing member extending from the lock path exit, wherein the portion of the fixing member extending from the lock path exit comprises the second end of the fixing member, the slack management opening comprising:

a slot on the housing, the slot shaped to accommodate and retain a slack portion of the fixing member, the slack portion of the fixing member on the portion of the fixing member extending from the lock path exit; and/or an opening through the housing, the opening different from the lock path, wherein insertion of the fixing member into the opening holds the locking mechanism in a locked position, wherein the slack management opening is configured to allow the slack portion to be inserted and removed by having two locking sections at each end thereof shaped to hold the slack portion, and a locking slot shaped to accommodate and retain the slack portion.

* * * * *